US010198448B2

(12) United States Patent
Jayaram et al.

(10) Patent No.: US 10,198,448 B2
(45) Date of Patent: Feb. 5, 2019

(54) SYSTEM AND METHOD FOR DISPLAYING SOCIAL NETWORK ANALYTICS

(71) Applicant: Microsoft Technology Licensing, LLC, Redmond, WA (US)

(72) Inventors: Vinodh Jayaram, Fremont, CA (US); Bradley Scott Mauney, Mountain View, CA (US); Udi Milo, Sunnyvale, CA (US); Eric Melz, Morgan Hill, CA (US); Nick Swartzendruber, Santa Clara, CA (US); Jason Chen, San Jose, CA (US); Aastha Jain, Sunnyvale, CA (US); Prachi Gupta, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 14/144,145

(22) Filed: Dec. 30, 2013

(65) Prior Publication Data

US 2014/0297631 A1 Oct. 2, 2014

Related U.S. Application Data

(60) Provisional application No. 61/806,276, filed on Mar. 28, 2013.

(51) Int. Cl.
*G06F 17/30* (2006.01)
*H04L 29/08* (2006.01)
(Continued)

(52) U.S. Cl.
CPC ....... *G06F 17/30106* (2013.01); *G06Q 50/01* (2013.01); *H04L 65/403* (2013.01); *H04L 67/22* (2013.01); *H04L 67/306* (2013.01)

(58) Field of Classification Search
CPC ................ G06F 17/30864; G06F 17/30867
See application file for complete search history.

(56) References Cited

U.S. PATENT DOCUMENTS 5,720,003 A 2/1998 Chiang
7,433,832 B1 10/2008 Bezos et al.
(Continued)

OTHER PUBLICATIONS

"U.S. Appl. No. 14/143,982, Final Office Action dated Jan. 21, 2016", 17 pgs.
(Continued)

*Primary Examiner* — Loc Tran
(74) *Attorney, Agent, or Firm* — Schwegman Lundberg & Woessner, P.A.

(57) ABSTRACT

A system, device, and method may include a network interface device configured to be communicatively coupled to a user interface. An electronic data storage may be configured to store social network data related to users having accessed a social network content item A processor, coupled to the network interface device and the electronic data storage, may be configured to identify a relationship among at least some of the users, determine a relevance of the relationship to a member of the social network associated with the social network content item based, at least in part, on a social network profile of the member and social network profiles of the users, and cause the network interface device to display, on the user interface, information related to the relationship on the user interface based, at least in part, on the relevance.

6 Claims, 10 Drawing Sheets

(51) Int. Cl.
*H04L 29/06* (2006.01)
*G06Q 50/00* (2012.01)

(56) References Cited

U.S. PATENT DOCUMENTS

| | | | |
|---|---|---|---|
| 7,873,621 B1* | 1/2011 | Datar | G06Q 30/02 707/706 |
| 8,504,486 B1 | 8/2013 | Pinto | |
| 8,688,796 B1 | 4/2014 | Lavian et al. | |
| 8,856,229 B2 | 10/2014 | Ramamurthy et al. | |
| 8,943,047 B1* | 1/2015 | Carpio | G06Q 10/06 707/723 |
| 8,990,393 B2 | 3/2015 | Rizk | |
| 9,032,306 B2 | 5/2015 | Wang et al. | |
| 9,043,397 B1 | 5/2015 | Ravichandran et al. | |
| 9,104,734 B2 | 8/2015 | Blaschak et al. | |
| 9,111,285 B2 | 8/2015 | Amidon | |
| 9,112,731 B2 | 8/2015 | Cohen | |
| 9,201,979 B2 | 12/2015 | Ramer et al. | |
| 9,240,059 B2 | 1/2016 | Zises et al. | |
| 9,323,784 B2 | 4/2016 | King | |
| 9,386,080 B2 | 7/2016 | Nowak | |
| 9,398,854 B2 | 7/2016 | Proud | |
| 9,454,586 B2 | 9/2016 | Ghosh et al. | |
| 9,483,908 B2 | 11/2016 | Shore et al. | |
| 9,516,360 B2 | 12/2016 | Grokop | |
| 9,524,077 B1 | 12/2016 | Pattan | |
| 9,665,584 B2 | 5/2017 | Jayaram et al. | |
| 2002/0161647 A1 | 10/2002 | Gailey et al. | |
| 2004/0117283 A1 | 6/2004 | Germack | |
| 2006/0129446 A1 | 6/2006 | Ruhl et al. | |
| 2007/0192130 A1 | 8/2007 | Sandhu | |
| 2009/0063247 A1 | 3/2009 | Burgess et al. | |
| 2010/0017237 A1 | 1/2010 | Dalesandro et al. | |
| 2010/0049590 A1 | 2/2010 | Anshul | |
| 2010/0049852 A1 | 2/2010 | Whitnah et al. | |
| 2011/0082825 A1 | 4/2011 | Sathish et al. | |
| 2011/0137776 A1 | 6/2011 | Goad et al. | |
| 2011/0191417 A1* | 8/2011 | Rathod | G06Q 30/02 709/204 |
| 2011/0302102 A1 | 12/2011 | Yeleshwarapu et al. | |
| 2012/0278127 A1 | 11/2012 | Kirakosyan et al. | |
| 2013/0055109 A1 | 2/2013 | Takamura et al. | |
| 2013/0097101 A1 | 4/2013 | Ortiz | |
| 2013/0218822 A1 | 8/2013 | Remaker et al. | |
| 2013/0268457 A1 | 10/2013 | Wang et al. | |
| 2014/0019233 A1 | 1/2014 | Goder et al. | |
| 2014/0019533 A1* | 1/2014 | Sherman | H04L 51/00 709/204 |
| 2014/0089816 A1 | 3/2014 | Dipersia et al. | |
| 2014/0122410 A1 | 5/2014 | Ludlow et al. | |
| 2014/0297748 A1 | 10/2014 | Mauney et al. | |
| 2014/0297749 A1 | 10/2014 | Jayaram et al. | |
| 2014/0298204 A1 | 10/2014 | Jayaram et al. | |
| 2015/0178811 A1 | 6/2015 | Chen | |
| 2015/0199715 A1 | 7/2015 | Caron | |
| 2015/0242518 A1 | 8/2015 | Rosenbaum et al. | |
| 2015/0242751 A1 | 8/2015 | Zhang | |
| 2015/0324865 A1 | 11/2015 | Illowsky et al. | |
| 2016/0007083 A1 | 1/2016 | Gurha | |
| 2016/0117329 A1 | 4/2016 | Busey et al. | |
| 2016/0140671 A1 | 5/2016 | Hong | |
| 2016/0217489 A1 | 7/2016 | Allard et al. | |
| 2016/0255170 A1 | 9/2016 | Gargi et al. | |
| 2016/0373891 A1 | 12/2016 | Ramer et al. | |

OTHER PUBLICATIONS

"U.S. Appl. No. 14/144,051, Non Final Office Action dated Feb. 26, 2016", 16 pgs.

"U.S. Appl. No. 14/144,226, Non Final Office Action dated Nov. 23, 2015", 13 pgs.

"U.S. Appl. No. 14/144,226, Response filed Feb. 23, 2016 to Non Final Office Action dated Nov. 23, 2015", 9 pgs.

"U.S. Appl. No. 14/143,982, Non Final Office Action dated Jul. 2, 2015", 27 pgs.

"U.S. Appl. No. 14/143,982, Response filed Oct. 2, 2015 to Non Final Office Action dated Jul. 2, 2015", 11 pgs.

"U.S. Appl. No. 14/144,051, Response filed Jun. 26, 2016 to Non Final Office Action dated Feb. 26, 2016", 19 pgs.

"U.S. Appl. No. 14/144,226, Examiner Interview Summary dated May 12, 2016", 3 pgs.

"U.S. Appl. No. 14/144,228, Response filed Aug. 29, 2016 to Final Office Action dated Apr. 29, 2016", 11 pgs.

"U.S. Appl. No. 14/143,982, Response filed Apr. 21, 2016 to Final Office Action dated Jan. 21, 2016", 10 pgs.

"U.S. Appl. No. 14/144,051, Examiner Interview Summary dated Apr. 21, 2016", 4 pgs.

"U.S. Appl. No. 14/144,226, Examiner Interview Summary dated Feb. 24, 2016", 3 pgs.

"U.S. Appl. No. 14/144,226, Final Office Action dated Apr. 29, 2016", 14 pgs.

"U.S. Appl. No. 14/143,982, Non Final Office Action dated Oct. 14, 2016", 22 pgs.

"U.S. Appl. No. 14/144,051, Notice of Allowance dated Feb. 2, 2017", 8 pgs.

"U.S. Appl. No. 14/144,051, Notice of Allowance dated Oct. 13, 2016", 10 pgs.

"U.S. Appl. No. 14/144,226, Examiner Interview Summary dated Dec. 14, 2016", 3 pgs.

"U.S. Appl. No. 14/144,226, Non Final Office Action dated Oct. 25, 2016", 15 pgs.

"U.S. Appl. No. 14/143,982, Final Office Action dated Jul. 13, 2017", 21 pgs.

"U.S. Appl. No. 14/143,982, Response filed Apr. 14, 2017 to Non Final Office Action dated Oct. 14, 2016", 12 pgs.

"U.S. Appl. No. 14/144,226, Examiner Interview Summary dated Aug. 1, 2017", 3 pgs.

"U.S. Appl. No. 14/144,226, Final Office Action dated Jun. 22, 2017", 15 pgs.

"U.S. Appl. No. 14/144,226, Response filed Mar. 27, 2017 to Non Final Office Action dated Oct. 25, 2016", 10 pgs.

"U.S. Appl. No. 14/143,982, Response filed Jan. 16, 2018 to Final Office Action dated Jul. 13, 2017", 12 pgs.

* cited by examiner

SYSTEM AND METHOD FOR DISPLAYING SOCIAL NETWORK ANALYTICS

PRIORITY

This application claims priority to U.S. Provisional Patent Application Ser. No. 61/806,276, filed Mar. 28, 2013, the contents of which are incorporated herein by reference in their entirety.

TECHNICAL FIELD

The subject matter disclosed herein generally relates to social network analytics.

BACKGROUND

Social networks conventionally provide for member of the social network to post content to the social network for viewing by others. Such content may include personal and/or professional information related to the member, media items, such as pictures, videos, text, and the like, links to third party content, comments, indications of approval of other content on the social network (e.g., "likes"), and so forth. Such content, once posted on the social network, may provide some or all of the basis for other members and other users of the social network to interact with the member who posted the content.

BRIEF DESCRIPTION OF THE DRAWINGS

Some embodiments are illustrated by way of example and not limitation in the figures of the accompanying drawings.

DETAILED DESCRIPTION

Example methods and systems are directed to recommended actions to promote social network activity. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In general, the more content a member posts to a social network the more others may tend to engage with the member on the social network. Such engagement may tend to come both from users who have previously engaged with the member on the social network (e.g., "contacts" or "friends") as well as people who engage with the member for the first time on the social network. Previous contacts with the member may engage more with the member owing to seeing the member's new content in the social network, such as in a newsfeed or other social network interface. New contacts for the member may be promoted because the content the member adds to the social network may cause such new contacts to discover the member through searches or forwards of the content by mutual contacts.

Certain user actions on the social network, such as the posting of various kinds of content, may tend to draw the attention of users of the social network with certain characteristics. For instance, a member may post content to the social network that tends to draw the attention of employees of a particular company or workers in a particular field or industry, or of various socio-economic characteristics. A system has been developed that may identify relationships between users of the social network that have accessed social media content posted by, or otherwise engaged with a member of the social network. Based, at least in part, on a relevance of the relationship to the member, the system may display information related to the relationship, such as statistics related to occurrences of the interactions and/or a rate of increase in such occurrences.

Figure 1:
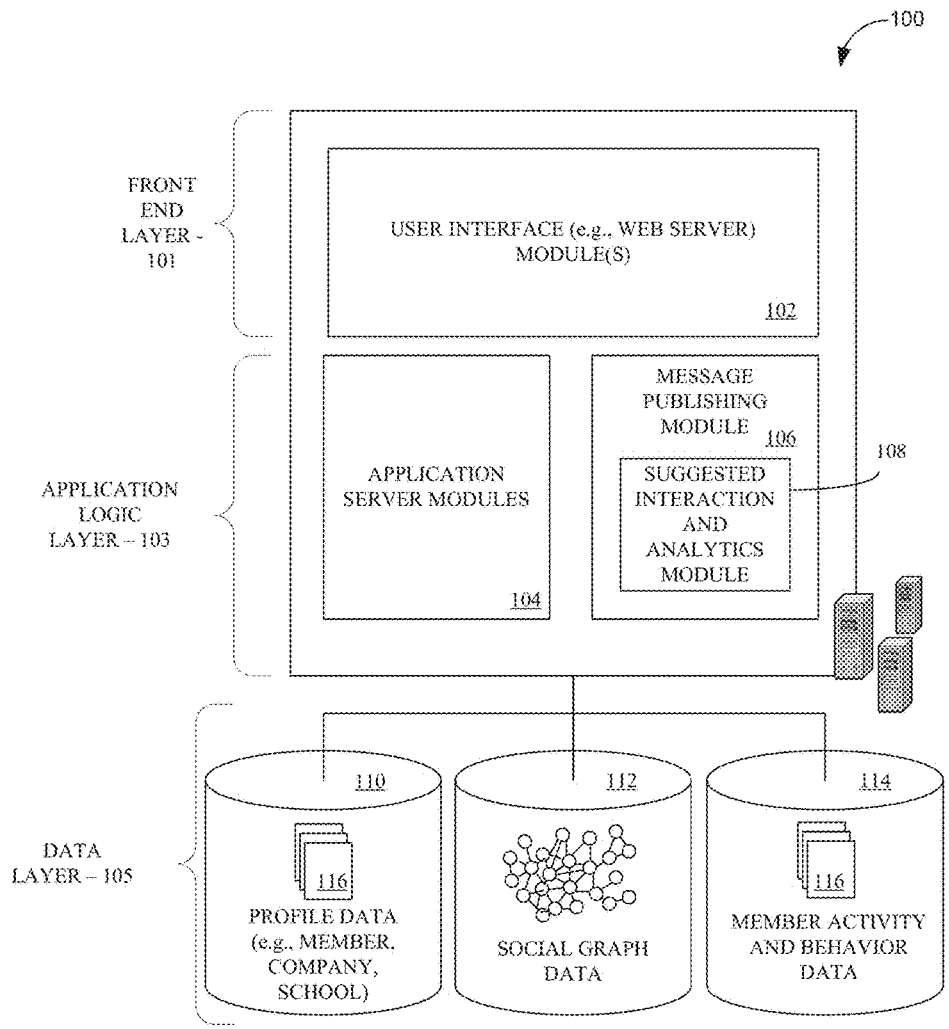
FIG. 1 is a block diagram illustrating various components or functional modules of a social network, in an example embodiment.

FIG. 1 is a block diagram illustrating various components or functional modules of a social network 100, consistent with some examples. A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generates various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104.

In some examples, the social network 100 includes a message publishing module 106, such as may be utilized to receive content, such as messages, posts, links, images, videos, and the like, and publish the content to the social network. The message publishing module 106, or the social network 100 generally, may include a recommended action and analytics module 108. As will be disclosed in detail herein, the recommended action and analytics module 108 may generate and present, such as via the message publishing module 106, recommended actions and/or related analytics to members of the social network 100 based on a relevance of various events, such as are stored in the data layer 105 or obtained via the application server module 104, the message publishing module 106, and/or the social network 100 generally. Additionally or alternatively, the recommended action and analytics module 108 may be a component of the application server module 104. The message publishing module 106 may control the manner in which the recommended actions and analytics are presented to the member.

As illustrated, the data layer 105 includes, but is not necessarily limited to, several databases 110, 112, 114, such as a database 110 for storing profile data, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

As members interact with the various applications, services and content made available via the social network service, the members' behavior (e.g., content viewed, links selected, etc.) may be monitored and information concerning the member's behavior may be stored, for example, as indicated in FIG. 1 by the database 114. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

The profile data database 110 and the member activity database 114 may, among other sources in the social network 100, include or store events 116. Such events include but are not necessarily limited to birthdays, anniversaries, change of status (employment, location, etc.), a publication, and a previous interaction. Such events may be stored automatically and/or may be stored on the basis of a user selection or choice.

Although not shown, with some examples, the social network 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Recommended Interaction and Analytics Module

Figure 2:
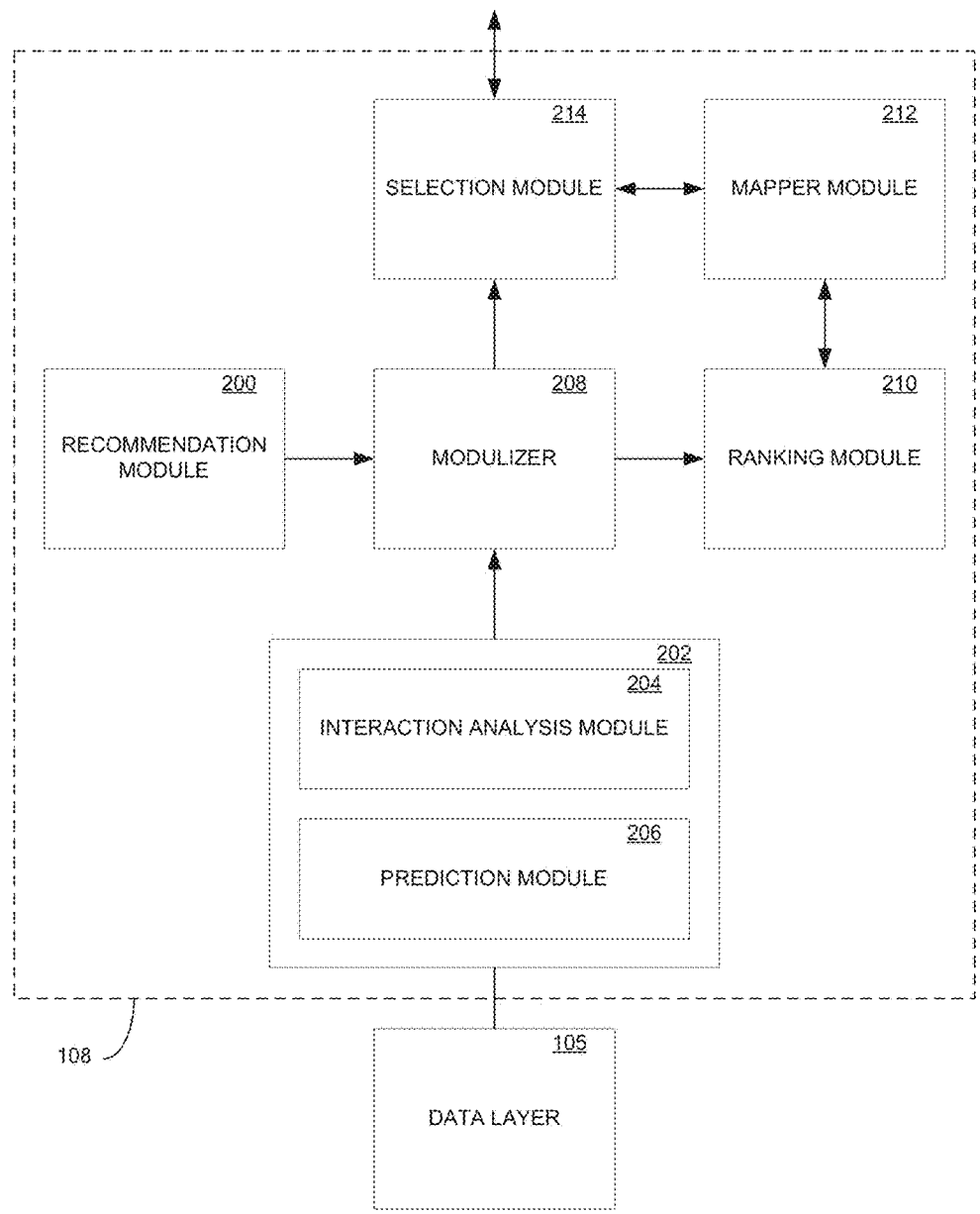
FIG. 2 is an example recommended interaction and analytics module and related functions of a system, in an example embodiment.

FIG. 2 is an example recommended interaction and analytics module 108 and related functions of the system 100. While the modules illustrated may be associated with the recommended interaction and analytics module 108, it is to be understood that the modules may be associated with or be components of any of a variety of the components of the system 100, as described above.

The recommended interaction and analytics module 108 includes a recommendation module 200 that is configured to provide recommendation to the member regarding various entities related to the social network that the member may desire to follow or otherwise associate with. For instance, the recommendation module 200 may utilize member characteristics and/or traits to identify one or more groups the member may wish to join, companies, organizations, groups, or individual the member may wish to follow, skills that the member may possess, and other activities within the social network. The recommendation module 200 may incorporate properties and techniques such as are detailed in U.S. patent application Ser. No. 13/679,765, "User Characteristics-based Sponsored Job Postings", and U.S. patent application Ser. No. 13/679,807, "User Characteristics-based Sponsored Company Postings", which are incorporated herein by reference in their entirety. The recommendation module 200 may incorporate both traits of the member as well as recommendations of other users of the social network, such as from endorsements or invitations.

The recommended interaction and analytics module 108 further includes an analytics module 202. The analytics module 202 may, in various examples, include one or both of an interaction analysis module 204 and a prediction module 206. The interaction analysis module 204 may provide analytics for users of the social network who have interacted with the member, such as by viewing a member profile page or searching for the member on the social network. The interaction analysis module 204 may identify relationships between users who have interacted with the member and provide analytics that may be of interest or relevant to the member.

The prediction module 206 may provide analytics related to an anticipated future result to interactions with the member on the social network by other users, such as what may happen if the recommended actions provided by the recommendation module 200 are implemented by the member. The analytics module 202 may provide additional social network analytics as may be desired, including analytics not necessarily for consumption by or presentation to the member. The prediction module 206 may predict a likelihood of a rate at which users of the social network may, for instance, go to a profile page of the member, and/or a likelihood of the member to actually implement the recommended action if the recommended action is presented to the member.

The recommendation module 200 and the analytics module 202 are coupled to the data layer 105 and to the databases 110, 112, 114, specifically. The recommendation module 200 and the analytics module 202 may utilize the data layer 105 to obtain any of a variety of social network data that may be useful to those modules 200, 202. Data generated by the recommendation module 200 and the analytics module 202 may be stored in the data layer 105.

The interaction analysis module 204 may analyze events 116 related to social network content items associated with the member for relationships between and among users of the social network that may be relevant to the member. The relationships, both in this context and in general, may be based on a common employer, a common industry, a common group, a common gender, and the like. Relevance may be determined based on similarities between the member's profile and the profiles of the users, such as may be stored in the profile database 110. Relevance to the member may be disregarded in various examples.

For instance, events 116 may have been recorded that indicate instances of users over a particular timeframe who have accessed a personal profile page of the member. The interaction analysis module 204 may compare known profile data or characteristics of some or all of the users to identify similarities between and among the users. For instance, the interaction analysis module 204 may note that certain of the users work at the same company, have the same or similar job title, work in the same or similar field, belong to the same group, live in the same city, metropolitan area, state, country, or other locality, have attended the same school, have a common interest, and so forth.

The profile data or characteristics of the users may optionally be compared against the profile characteristics of the member, such as to determine relevance of the characteristics to the member. Thus, in an illustrative example, a characteristic related to location may be of greater relevance to the member if it is the same location as that of the member than if it is a different location. It is, however, emphasized that relevance may not be applied, as analytic data may be of interest or use to the member even if the characteristics of the users do not match with that of the member; for instance, a member may still be interested to know if many people from a city different than the member's own city are interacting with the member's profile.

In various examples, the characteristics may further account for characteristics of the social network as a whole. Thus, for instance, characteristics such as employer and skills may be of greater significance in a social network having a characteristic of being oriented toward enabling communication and engagement between professionals. Characteristics such as interests, gender, and sexual orientation may be of greater significance in a social network having a characteristic of being related to social interaction.

The interaction analysis module 204 may generate and provide as output a statistic concerning the relationship between the users. For instance, the interaction analysis module 204 may provide a percentage of total users who have interacted with the member who share each identified characteristic. Thus, by way of illustrative example, the interaction analysis module 204 may determine that twenty-seven (27) percent of users who have accessed the member's profile page in the last two (2) weeks work at Company X. The interaction analysis module 204 may alternatively or additionally provide raw data. Thus, the interaction analysis module 204 may further provide that eighteen (18) users who have accessed the member's profile page are from Company X.

The interaction analysis module 204 may save statistics in the data layer 105 and access such statistics to identify trends in user interactions with the member. Thus, to continue the illustrative example, the interaction analysis module 204 may have noted one (1) month previously that eight (8) percent of users who have accessed the member's profile page are from Company X. Thus, the interaction analysis module 204 may generate a statistic note a nineteen (19) percentage point increase in the number of users from Company X who have interacted with the member and that the rate of users from Company X who have accessed the member's profile page has more than tripled in a month.

The interaction analysis module 204 may further note the manner in which users interact with the member. For instance, the events 116 may record that a user discovered the member's profile page though a general search or through a direct link. Events may record that the link may have been accessed through the social network directly, such as via a newsfeed, or from a link from a third party webpage or email.

While the discussion herein has been related to the anticipated results of prospective actions, it is to be noted that the principles may be applied to events 116 that have occurred in the past. Thus, past actions, as recorded in events 116, may be correlated to changes in interactions and the results presented to the member in the same or similar manner disclosed herein. Thus, an event 116 may be selected and changes in interactions with the member following the occurrence of the event 116 noted and displayed. The interaction analysis module 204 may note particularly significant correlations, e.g., that a particular event 116 or type of event 116 resulted in a particularly large increase in interactions with the member. Such results may be obtained as part of the prospective development of recommendation, i.e., as part of developing the prospective benefit from doing an action of the same or similar type as an event 116, the change in interactions with a member may be noted and displayed in the same manner as a recommended action as disclosed herein.

While the discussion herein has referred to the member's profile page, it is to be understood that any social network content item associated with the member may be utilized. Thus, for instance, interactions may be with a status update by the member, an article posted by the member, a page from a group to which the member belongs, and so forth. The interaction analysis module 204 may discriminate between such social network content items or may consider all social network content items associated with the member as a whole.

In various examples, the interaction analysis module 204 provides a predetermined number of analytics related to the member as described above. In various examples, the interaction analysis module 204 may search the data layer 105 and develop as many statistics as it can based on the amount of time and resources it has available. The interaction analysis module 204 may search for data over a predetermined time period, such as two (2) weeks, one (1) or two (2) months, or any desired time period.

The prediction module 206 may similarly search events 116 and the data layer 105 generally to determine statistics related to the interaction of users with social network content generally. In particular, the prediction module 206 may note events 116 from users and statistics related to how those events 116 change the ways in which other users of the social network interact. The prediction module 206 may then utilize those The prediction module 206 may be seeded with actions that users of the social network have taken and that the member may take that may result in increased activity engaged by other users of the social network with the member. The prediction module 206 may then note events 116 in which those actions were performed by users of the social network and develop a statistical profile of how those changes tend to result in changes in the ways in which the other users of the social network interact with the user who did or who is associated with the event 116. Those statistical profiles may then be prospectively applied to the member to generate a forecast of an expected result to user interaction with the member if the member does such an action. The prediction module 206 may further generate a statistical profile of the member to anticipate a likelihood of the member to implement recommended actions as presented to the member.

For instance, the prediction module 206 may monitor instances in which a user of the social network adds a photograph, edits their profile, such as by adding a skill to their profile, joins a group, follows a company, organization, or individual, shares a link, article, or story, and so forth. The prediction module 206 may then search for events 116 related to the user who performed the action, such as other users of the social network who clicked on a link or went to the related profile page, or the number of times or the rate at which the user showed up in search results. By repeating that analysis for multiple occurrences of the same type of action, the prediction module 206 may develop a statistical profile for that type of action.

The statistical profile may be relatively basic. For instance, the prediction module 206 may note that, on average, joining a group tends to result in the user who joins the group being interacted with by other users increasing by fifteen (15) percent over a following time period, such as two (2) weeks, one (1) month, two (2) months, or other time period. A basic statistical profile may not discriminate between the nature of the users who conduct the subject activity.

By contrast, the statistical profile may be relatively more complex. The statistical profile may note different impacts to user interaction depending on the nature of the user who engaged in the activity. Thus, in an illustrative example, a user who has a relatively small social graph or who engages in relatively few activities may experience a relatively larger impact to the rate at which users interact with them from one activity in comparison to a user who has a large social graph or who is a regular contributor to the social network. It is to be recognized that the statistical profiles for activities may reflect that certain actions may be more productive for more passive users of the social network than active users and that other actions may be more productive for active users than for passive users. It may be for the prediction module 206 to determine the statistical profile of the various actions.

Based on the statistical profile of the various potential actions, the prediction module 206 may generate statistics on a predicted impact to the number of or rate at which users of the social network interact with the member if the member were to implement the potential action. The predicted impact may be based on a basic or complex statistical profile. The prediction module 206 may generate a prediction for each of multiple potential actions or, in various examples, for every type of the potential actions.

The statistics may be custom to the member. Thus, characteristics of the member may be referenced against the statistical profile to determine the predicted impact to the member. For instance, if the member has three hundred (300) connections in the social network and hasn't updated their profile in more than one (1) year, the prediction module 206 may determine that updating the member's profile would be expected to result in approximately a thirty (30) percent increase in the rate at which users access the member's profile over a given time period.

The prediction module 206 may analyze the data layer 105 generally to identify relationships between action and resultant increases in user interaction with the user who took the action. Thus, for instance, the prediction module 206 may note that adding a skill to the user's profile would have a greater tendency to drive user interactions with the user's profile page if the user is a professional or works in certain fields than if the user is not a professional or is employed in different fields.

The prediction module 206 may analyze the member's past reaction to recommended actions to anticipate the member's likelihood of implementing a recommended action that has been presented to the member. Thus, a member may have a history of accepting fifty (50) percent of recommended groups and a five (5) percent likelihood of posting an update following a such recommended actions being presented to them. As disclosed herein, the system 100 generally may utilize such information in deciding what recommended actions to present to the member and in what order.

The data generated by the analytics module 202 in general may be transmitted to a modulizer 208. The modulizer 208 may generate the recommended interactions themselves or analytics based on the statistics as generated and provided by the analytics module 204. The recommended interactions may include an action either in generic form (e.g., update your profile) or may include a specific recommendation from the recommendation module 200 (e.g., follow Company X). The analytics may include particular data related to users of the social network who are interacting with the member, as disclosed herein. The whether the recommended interactions and/or analytics are actually presented to the member may be for another module to determine.

The modulizer 208 may utilize any of a variety of techniques to select the recommended interactions and/or analytics for consideration by the rest of the recommended actions and analytics module 108, as disclosed herein. In an example, the modulizer 208 utilizes a database search function, such as Hadoop, to obtain information from the databases 110, 112, 114. In an example, the database search function operates daily for some or all of the members of the social network. In an example, the database search function may generate a predetermined collection of data, such as a matrix of various characteristics. In an example, the matrix may include, for each member, a result for each matrix vertex of data related to each data type (e.g., groups, skills, organizations or individuals to follow, etc), a date range, a ranking of the data, and other factors. In an example, a daily database search function for a member results in forty-eight (48) individual results.

The modulizer 208 may further compile the data generated by the analytics module 202 for transmittal as a block of data and/or establish how the data may be grouped for ultimate assessment for utility and presentation to the member. The modulizer 208 may further add context to the data, such as timeframes over which the data is valid and to whom the data applies.

The modulizer 208 may transmit the data to a ranking module 210. The ranking module 210 may rank for relevance or significance to the user the data as compiled and organized by the modulizer 208 or, in various examples, may simply access the analytics module 202 directly. The ranking module 210 may access the data layer 105, such as the profile database 110, it identify relevance of the data to the member. The relevance function may have already been performed by the analytics module 202, as noted above. The ranking module 210 may include machine learning protocols known in the art for updating how relevance is updated and determined, including based on feedback for how frequently the members to which recommendations are presented follow through on recommendations and characteristics of the member, either objectively or in relation to the recommendation, tend to correlate with following through on the various specific recommendations.

In an example, the ranking module 210 may replace, at least in part, the function of the modulizer 108. The ranking module 210 may execute database search functions as described herein and may rank recommended actions and/or analytics based events 116 and/or other pertinent data in the databases 110, 112, 114 according to various criteria. In an example, the recommended actions and/or analytics may be ranked generally according to their applicability to the average member of the social network or general usefulness for all or a predefined subset of the members of the social network. Additionally or alternatively, the ranking module 210 may regularly or continually crawl through recommended actions and/or analytics and rank those recommendations and/or analytics against individual members. As a result, various members of the social network may have a population of rankings available that may be presented without the need to separately search using the modulizer 108. In such an example, the modulizer 108 may not be utilized and the recommendation module 200 and analytics module 202 may feed directly to the ranking module 210.

The modulizer 208 may further transmit data to a mapper module 212. The mapper module 208 may be a component of the recommended interaction and analytics module 108 or may be a component of the user interface module 102. If the mapper module 212 is a component of the recommended interaction and analytics module 108 the mapper module may output data to the user interface module 102.

The mapper module 212 may assess the recommended interactions as generated by the modulizer 208 and determine a position for the recommended interactions. The mapper module 212 may further act as a conduit from the user interface module 102 to provide general information about the member, such as a member identification, that may be utilized by the recommended interaction and analytics module 108 as a whole for some or all of the actions described herein.

A selection module 214 may select which recommended interactions and/or analytics to present to the user. The selection module 214 may select a predetermined number of recommended interactions and/or analytics and may factor in the relevance of the various recommended interactions and/or analytics if the relevance has been determined. The selection module 214 may select the recommended interactions and/or analytics based on the ranking by the ranking module 210. The selection module 214 may send the selected recommended interactions to the user interface module 102 by way of the mapper module 212, which, as noted above, may select the positions for the recommended interactions and/or analytics as selected.

Figure 3:
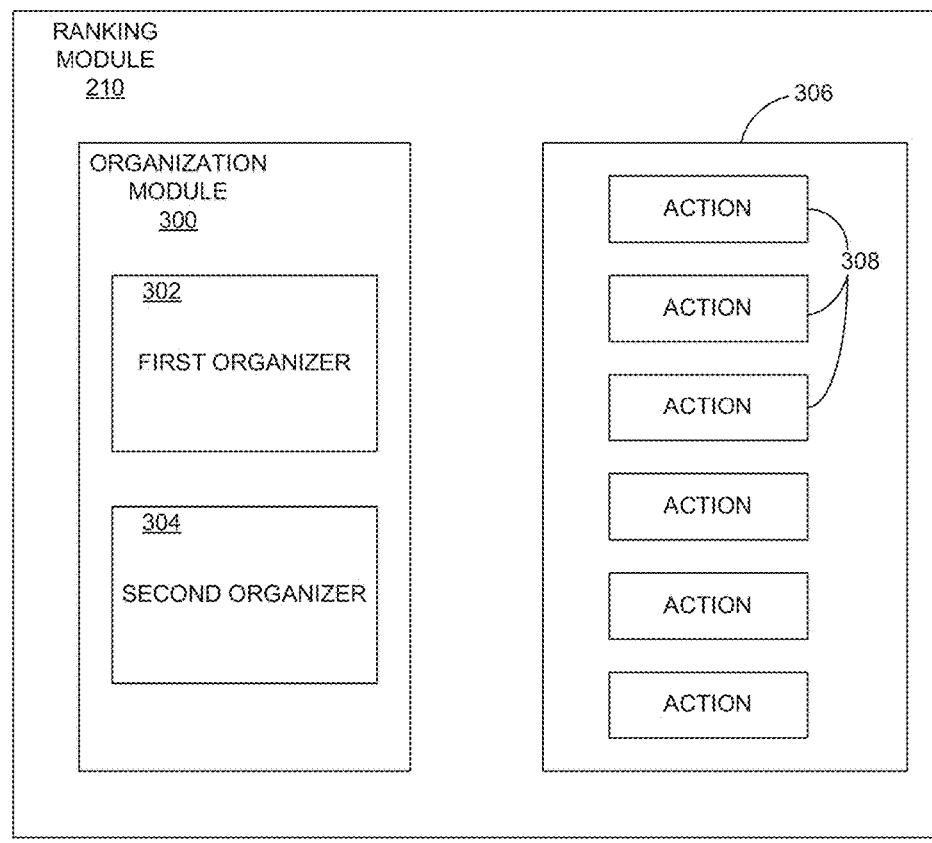
FIG. 3 is a block diagram of the ranking module, in an example embodiment.

FIG. 3 is a block diagram of the ranking module 210. While the ranking module 210 may be implemented, at least in part, as illustrated, it is to be understood that various alternative examples of the ranking module 210 may be implemented.

The ranking module 210 includes an organization module 300 for organizing recommended actions and/or analytics according to their respective ranks. The organization module 300 may generate output in a format that may be utilized by the mapper module 212 and/or the user interface module 102 to position recommended actions and/or analytics on a user interface. The organization module 300 optionally includes a first organizer 302 and a second organizer 304 and optionally additional separate organizers, such as may be utilized to separately organize recommended actions and/or analytics according to a manner in which the recommended actions and/or analytics are to be displayed to the member. For instance, the first organizer 302 may be utilized to organize the recommended actions and/or analytics for display on a homepage of a webpage while the second organizer 304 may be utilized to organize the recommended actions in a portion of the webpage, such as tabs or in a menu.

One or both of the organizers 302, 304 may organize the recommended actions and/or analytics according to categories. The categories may be predefined, such as according to subject matter, according to priorities for the individual types of recommended actions and/or analytics, or other criteria as may be desired. Thus, for instance, an organizer 304 may organize a recommendation to follow an industry or analytics related to the industry with analytics related to a particular geographic region; an organizer 304 may organize a recommendation to follow a company or analytics related to a company with analytics related to an occupation; and an organizer 304 may organize analytics related to sources of searches that have turned up the member with analytics related to the keywords that produced the member as a search result. The organizer 304 may organize analytics based on a provenance of the users arriving at the member's profile page generally, i.e., by searching or using a search engine, by linking from another webpage or email outside of the social network, the accessing of another social network content item related to the user, such as a posted article or status update, a photograph, and the like, and so forth.

The organization module 300 may receive data from an actions module 306, which may include individual action elements 308. The action elements 308 may be individual actions that a user may take. The action elements 308 may then be ranked by the modulizer 208.

User Interface

Figure 4:
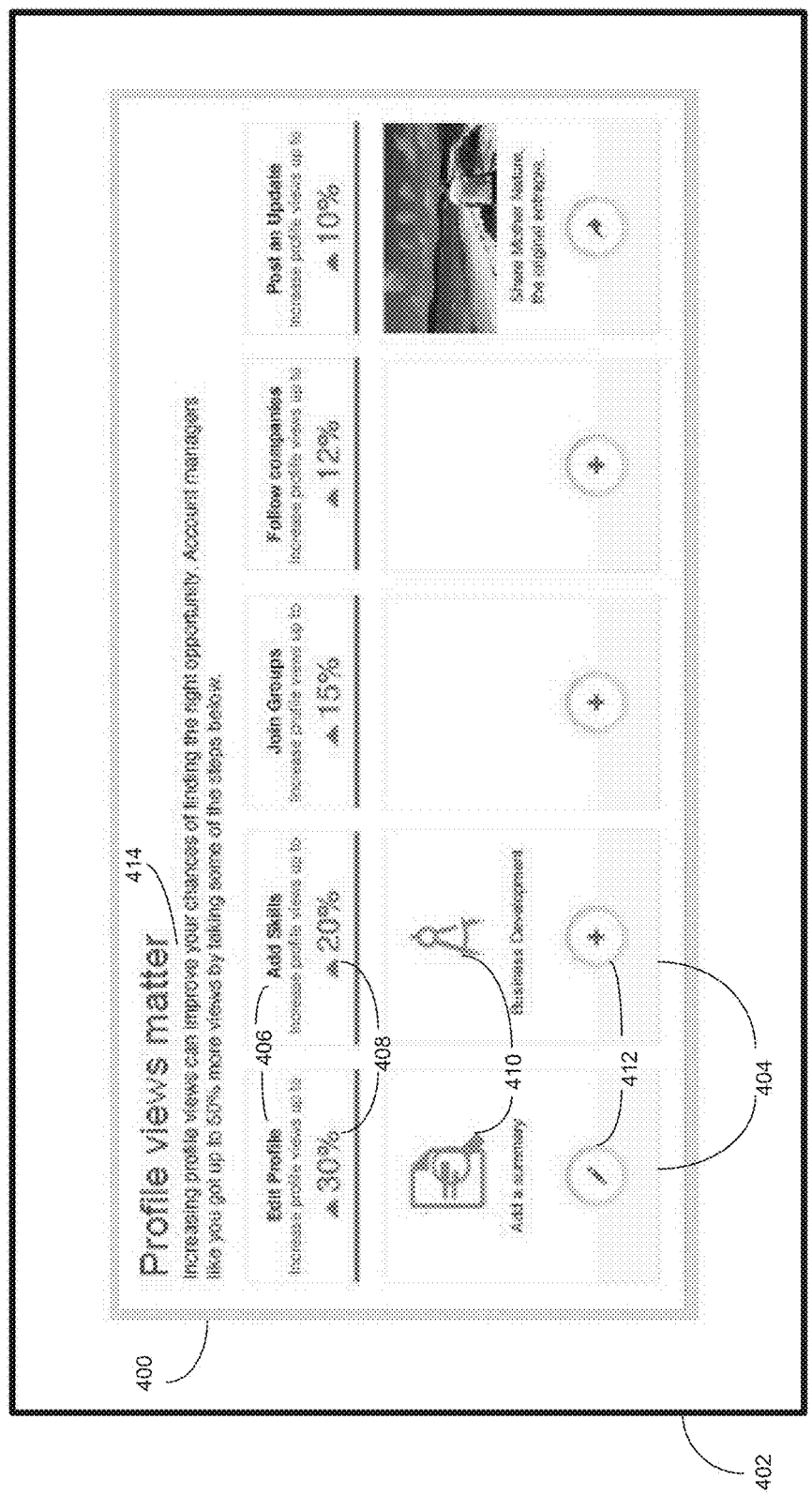
FIG. 4 is an image of a user interface displaying recommended actions, as generated by a user interface module, in an example embodiment.

FIG. 4 is an image of a user interface 400 displaying recommended actions, as generated by the user interface module 102. The user interface 400 is displayed as part of a webpage or application on an abstract user device 402 associated with the member, such as a smartphone, personal computer, tablet computer, personal digital assistant (PDA), and the like. The user device 402 is communicatively coupled to the system 100 via a network, such as the Internet.

The user interface 400 as illustrated includes multiple recommended actions 404. Each recommended action 404 includes a title 406 and an estimated benefit 408 to user interactions with the member, such as an expected percentage increase in views of a profile page of the member or other social network content item associated with the user. Each recommended action 404 further includes a description 410 of the action itself and a selector 412 providing a mechanism for the member either to implement the recommended action 404 (e.g., join a group) or a link to a webpage, application, or other mechanism that would allow the member to implement the recommended action 404 (e.g., a profile editor to edit the member's profile). It is to be understood that while the recommended actions 404 include the components 406, 408, 410, 412 as illustrated, various alternative forms of the recommended interactions 404 do not necessarily include all such components. Further, the user interface 400 optionally includes a title and explanation 414 configured to encourage the member to implement the recommended actions 404 as presented.

The various components 406, 408, 410, 412 include characteristics, such as color, character and/or image size, character font, and location on the user interface 400. In various examples, those characteristics may be may be selectable and/or configurable in a way that may tend to make the corresponding recommended action 404 more or less visible or eye-catching to the member as the member views the user interface 400. For instance, a larger character or image, italics, bold, or underlined font, bright colors, and a higher location on the user interface 400 may tend to make the recommended action 404 more likely to be seen or interacted with by the member.

However, it is to be understood that various members and users may react differently to different characteristics. Certain users may react more to certain colors than others; certain users may more readily notice italics while others may more readily notice bold or underlined text; and so forth. Thus, what works to emphasize a recommended action 404 for one user may be less effective or ineffective with another user. Moreover, it may be undesirable to overly emphasize a recommended action 404; the user interface 400 may include multiple social network content items, and a user experience with the social network as a whole may be undermined if too much emphasis is placed on recommended actions.

In an example, one or more characteristics of the recommended action 404 (or, additionally or alternatively, an analytic or other social network content item) is iteratively varied or adjusted and the reaction of the member assessed to the various characteristic adjustments. For instance, in a first presentation of a recommended action 404 a color of the estimated benefit 408 is set as a first shade of green. Implementation or non-implementation of the recommended action, such as by selecting the selector 412, is recorded by the system 100, such as in the member activity and behavior database 114. A subsequent time a recommended action 404 (not necessarily the same recommended action 404, though the subsequent presentation may be the same or substantially the same as the previous presentation) is displayed to the member, the color of the estimated benefit 408 is changed, such as to a shade of blue. The implementation or non-implementation of the recommended action 404 is again recorded.

As the color of the estimated benefit 408 is iteratively changed, data related to the reaction of the member to the various colors may be stored and analyzed for which color is best for presentation to the member. For instance, if a shade of green tends to produce a desired rate of selections of the selector 412 by the member then the estimated benefit 408 may consistently be presented to the member in green.

Data may also be recorded about overall member use of the social network as the characteristics are iteratively changed. If various characteristics as presented to the member also tend to coincide with reduced member selection of other social network content items, or reduced member use of the social network as a whole, it may be determined that the presentation of the characteristic is having a negative impact on the overall member experience or undesirably distracting the member from other social network content. For instance, it may be determined that the estimated benefit 408 presented in green to the member produces a twenty-five (25) percent increase in the rate of selection of the selector 412 but also a twenty (20) percent decrease in overall member use of the social network. In such an example, green may be an undesirable color for the recommended action 408, and a color with a reduced selection rate but an improved overall social network use may be preferred.

Characteristic data from one user of the social network may be utilized in selecting a characteristic for other users. For instance, if it is known that the color red reduces the selection rate for users in general and that the color green improves the selection rate for users in general then testing green may be favored for the member over testing red. For instance, if, overall, green tends to provide a selection rate fifty (50) percent greater than red then green may be twice as likely to be iteratively presented to a member than red. Additionally or alternative, member interaction with a characteristics may be weighted to the extent that the interacting tends to confirm that of other users. Thus, if initial member reaction to green tends to confirm that the member reacts favorably to green then green may be utilized most readily as a color for the estimated benefit.

As noted above, the iterative changing of the characteristic may tend to provide an optimized quality for the characteristic for the member. Upon the development of statistical confidence that a particular characteristic optimizes user interaction with the recommended action 404, such as one (1) to six (6) standard deviations, the system 100 may variously cease, at least temporarily, iteratively adjusting the characteristic or may weight the iterative changing of the characteristic to favor the optimized characteristic. For instance, upon settling on the color green for the member, as in the above example, the system may cease iteratively changing the color for a period of weeks or months. The iterative changing of the color may be restarted after a period of time, such as weeks or months, to verify that green remains the optimized color for the member.

Additionally or alternatively, the iterative changing of color may not cease but may be weighted to favor green. For instance, each color may be equally weighted before iteratively presenting the colors to a member. As colors are presented to the member the weights may be adjusted according to the member's reaction to the color; thus, if a first color tends to produce a ten (10) percent greater selection rate than a second color then the first color may be presented to the member ten (10) percent more frequently than the second color, with the principle involved expanded to include many different colors. However, upon a color being identified with statistical confidence as being the optimized color for a member, the color may be weighted significantly more heavily than the simple comparison of the selection rate for the color. For instance, upon selecting a color as the optimized color, the color may be weighted multiple times more heavily than other colors, such as two (2) to ten (10) times more heavily.

It is to be recognized that more than one characteristic may be iteratively changed at a time. For instance, font size, font type, and color may all be changed concurrently. In such an example, the effect of each characteristic may be parsed between and among the various iterations to determine the statistical significance of each characteristic.

As illustrated, the recommended actions 404 are arranged according to a greatest to least likelihood of a user of the social network to interact with the profile of the member. Thus, a recommended action 404 with an expected thirty (30) percent increase in visits of the member's profile page is presented before a recommended action 404 with an expected twenty (20) percent increase in visits to the member's profile page. However, in various examples, recommended actions may be arranged according to alternative criteria. For instance, the recommended actions 404 may be arranged according to a likelihood of the member to actually implement the recommended action 404. Thus, a recommended action 404 with a relatively low projected increase in visits to the member's profile page may be displayed ahead of a recommended action 404 with a relatively high projected increase in visits if the recommended action 404 with the low projected increase is more likely to actually be implemented by the member. In an example, the recommended actions 404 are arranged according to a statistical combination, such as a sum, of the projected increase in visits and the likelihood of the member to implement the recommended action 404.

Figure 5:
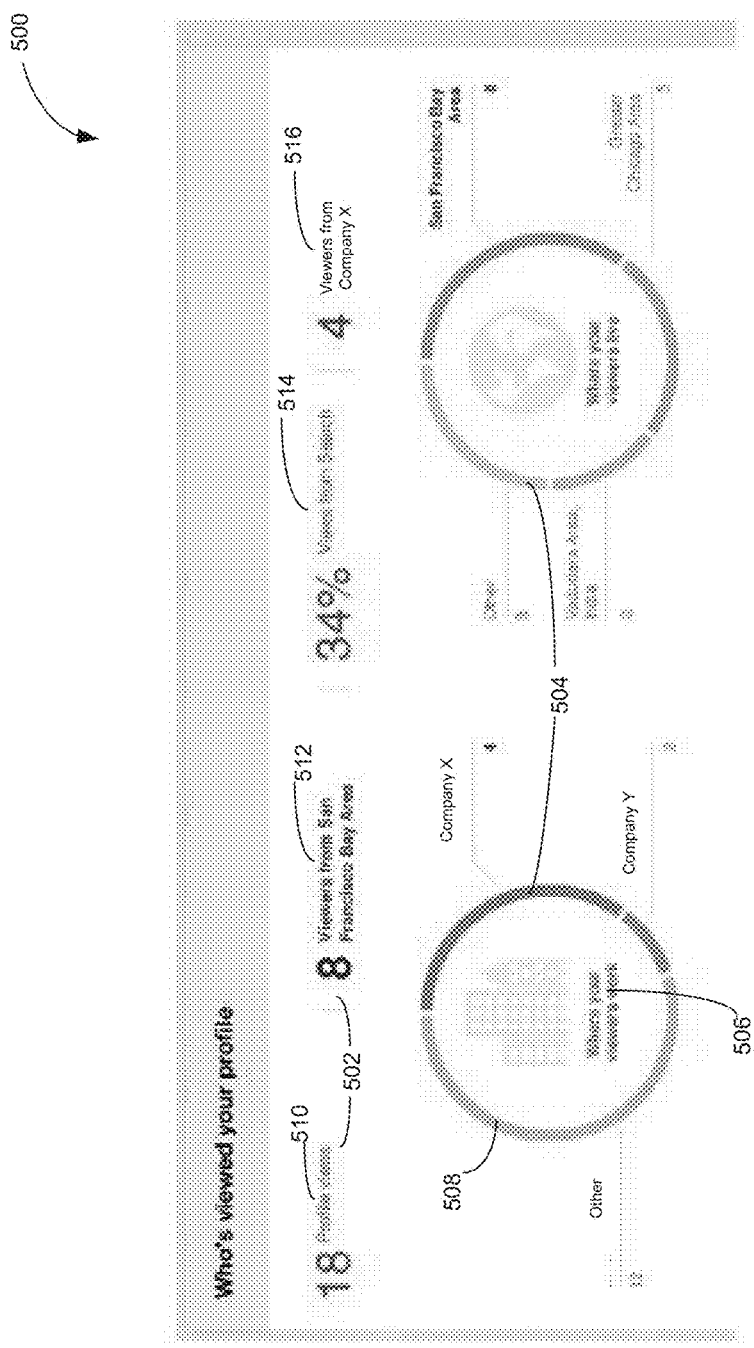
FIG. 5 is a depiction of analytics as presented on a user interface, in an example embodiment.

FIG. 5 is a depiction of analytics 500 as presented on the user interface 400. As noted above, the principles disclosed herein with respect to the recommended actions 404 apply equally well to the analytics 500.

As illustrated, the analytics 500 include both numerical representations 502 and graphical representations 504, though it is to be understood that the analytics 500 do not necessarily include both or multiple instances of both. The numerical representations 502 optionally include both absolute numbers related to the analytics categories and percentages. The analytics may include both a static number or percentage or a rate or change in rate, such as a number or rate increase of a category over time.

As illustrated, the graphical representations 504 include an analytic descriptor 506, including a title and a graphic, as well as the statistic graphic 508. The descriptor 506 optionally includes only one or of the title and the graphic. The statistic graphic 508 may be any of a variety of statistic graphics known in the art, including, but not limited to, pie charts, bar graphs, line graphs, scatter plots, and the like.

While the analytics 500 are not presented as including a user selection, the characteristics of the analytics may be adjusted for display to a member based on the optimization of the same or similar characteristics disclosed with respect to the recommended actions 404. Thus, if the iterative presentation of recommended actions 404 identifies a particular color as provoking the preferred rate of interactions from the member, the analytics 500 may be presented using the same color, at least in part.

The analytics 500, as illustrated, relate to the origin of member profile views from users of the social network. Such categories include a total number of profile views 510, a common geographic location 512 of profile views, such as a region from which the most views originate, a mechanism 514 by which users who viewed the member's profile page arrived at or found the page, and a company or organization 516 with which some or most of the viewers originated. More or fewer categories may be displayed and in varying orders.

Figure 6:
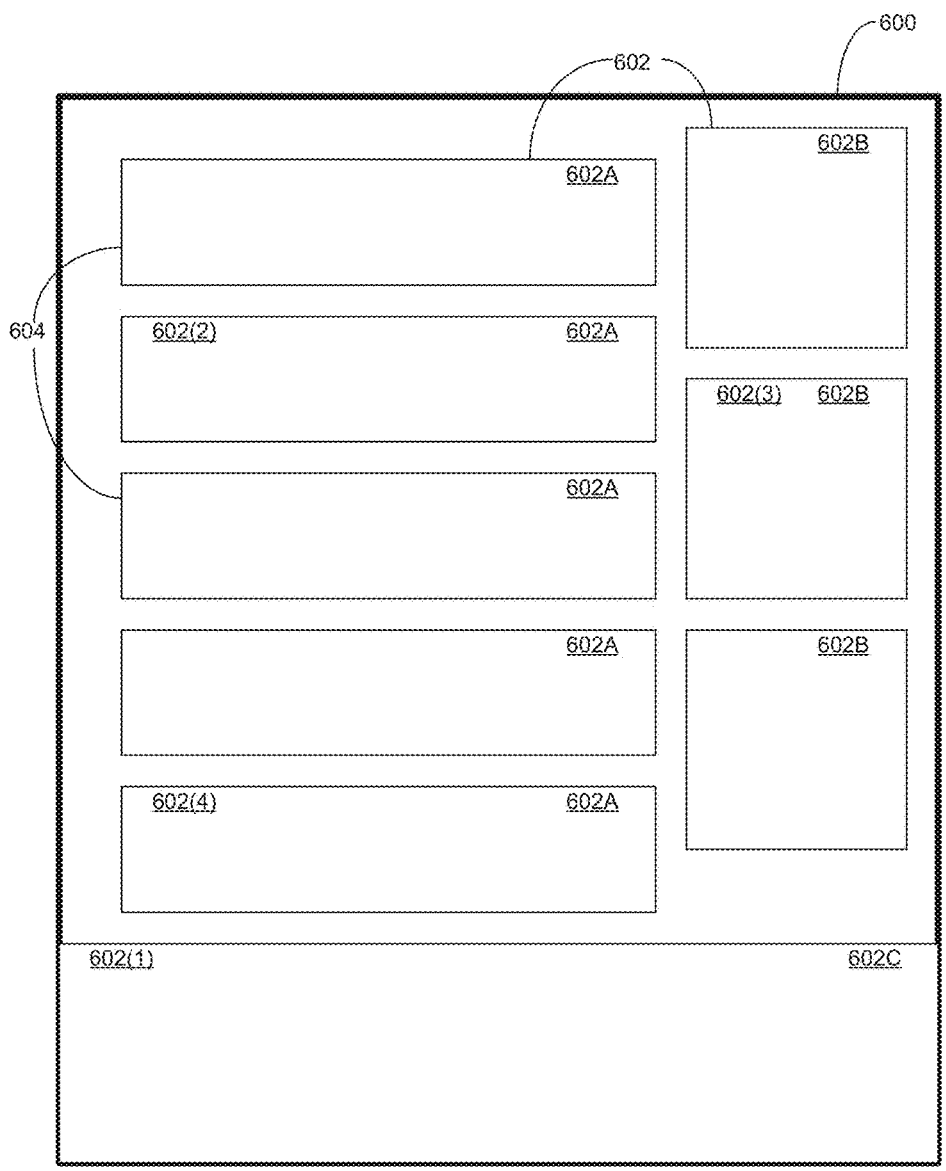
FIG. 6 is an abstract illustration of a user interface for a social network, in an example embodiment.

FIG. 6 is an abstract illustration of a user interface 600 for a social network as disclosed herein. The user interface 600 includes the interleaving of recommended actions 404 and/or analytics 500. The interleaving of recommended actions 404 and/or analytics 500 (herein after recommended actions 404 for brevity and without limitation) may be achieved, at least in part, by treating a position or location of the recommended actions 404 as a characteristic as disclosed above and adjusting the characteristic until interaction by the member with recommended actions 404 reaches a desired level.

The user interface 600 includes multiple positions 602, including scrolling positions 602A, such as in a newsfeed or related content item display configuration. The scrolling positions 602A may be scrolled through with a selection by the member, in which positions 602A may scroll on and off the user interface. The positions 602 optionally further include side positions 602B which are set apart from the scrolling positions 602A and which do not necessarily scroll. The positions 602 optionally further include fixed positions 602C which may be positioned in column with the scrolling positions 602A but which do not scroll with the scrolling positions 602A. It is to be recognized that additional or alternative positions 602 may also be included in the user interface 600.

In general, a position 602 into which the recommended actions 404 may be inserted may be iteratively adjusted to achieve a preferred member interaction with the recommended actions 404. Because the position or positions 602 into which the recommended actions may be inserted may vary, the recommended interactions 404 may be interleaved with other social network content items 604.

In an example, the recommended interaction and analytics module 108 may iteratively change a position 602 of a recommended interaction 404 from a first position 602(1) to a second position 602(2) to a third position 602(3) to a fourth position 602(4), and so forth. The system 100 may collect data regarding interaction by the member with the recommended action 404 in the various positions 602. The recommended interaction and analytics module 108 may note that the member interacted with the recommended action 404 the most when the recommended action was in the scrolling positions 602A, i.e., the positions 602(2) and 602(4), and the least when in the side position 602B, i.e., the position 602(3). The recommended interaction and analytics module 108 may consequently favor one or more of the scrolling positions 602(2), 602(4) for positioning the recommended actions 404. Social network content items 604 may be placed in positions 602 that are not occupied by the recommended actions 404.

Flowcharts

Figure 7:
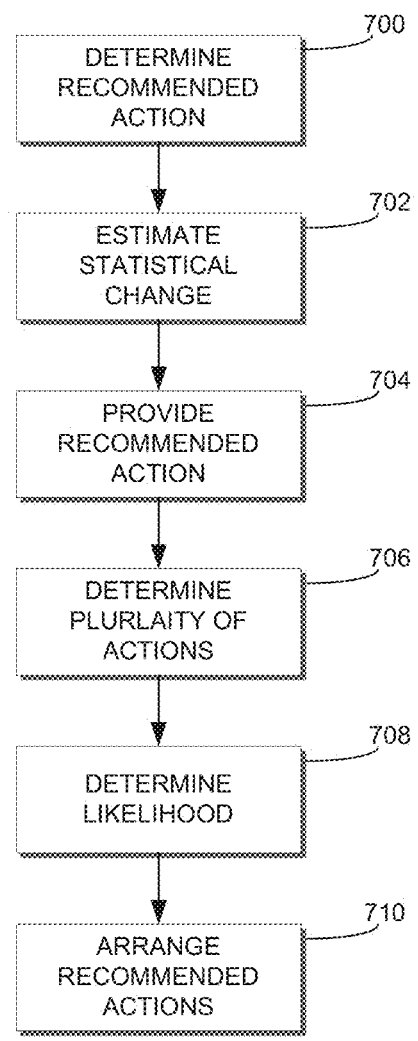
FIG. 7 is a flowchart for recommending actions on a social network, in an example embodiment.

FIG. 7 is a flowchart for recommending actions on a social network. The flowchart may be performed with any of a variety of devices and systems disclosed herein, as well as with any suitable system known in the art.

At operation 700, a recommended action that a member of the social network may take to increase a likelihood of at least one of a plurality of uses of the social network to access a social network content item related to the member is determined, such as with a processor coupled to an electronic data storage.

At operation 702, an estimated statistical change in a rate at which the plurality of users access the social network content item if the recommended action were implemented by the member is determined based, at least in part, on social network data stored in the electronic data storage. The estimated statistical change may be determined by the processor. In an example, the estimated statistical change is a percentage increase in a rate at which the social network content item may be accessed by the plurality of users. In an example, the estimated statistical change is based on at least one of a current rate at which the social network content item is accessed and a statistical change that occurred from similar recommended actions as indicated by the social network data. In an example, the rate is based on a number of accesses of the social network content item over time over a predetermined period less than a period including all of the social network data. In an example, the social network content item is a profile related to the member.

At operation 704, the user interface is optionally provided with the recommended action and estimated statistical change, such as with a network interface device coupled to the processor.

At operation 706, a plurality of recommended actions are optionally determined.

At operation 708, the likelihood of the member to implement the recommended actions as recommended may optionally be determined, such as with the processor. In an example, determining the likelihood to implement is based on the data as stored from the plurality of users and on a past acceptance by the member of a recommended action and of other users to access a product of the recommended action as implemented.

At operation 710, the recommended actions are optionally arranged and displayed according to the estimated statistical change for each of the recommended actions. The recommended actions may be arranged and displayed with the network interface device. The recommended actions may be arranged based, at least in part, on the likelihood of the member to implement, as determined in operation 708. In an example, the presentation of the recommended actions on the user interface is in order of a greatest statistical change and a likelihood of the member to implement each of the recommended actions.

Figure 8:
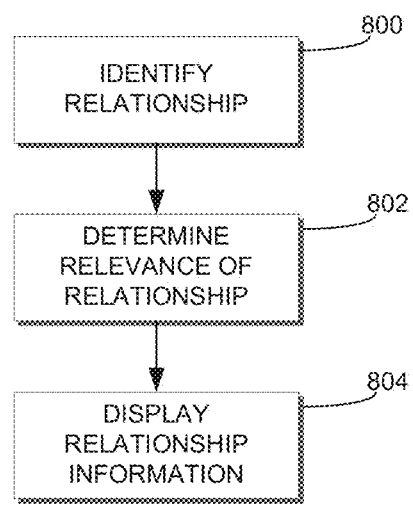
FIG. 8 is a flowchart for displaying social network analytics on a user interface, in an example embodiment.

FIG. 8 is a flowchart for displaying social network analytics on a user interface. The flowchart may be performed with any of a variety of devices and systems disclosed herein, as well as with any suitable system known in the art.

At operation 800, a relationship among at least some of a plurality of users is identified, such as with a processor.

At operation 802, a relevance of the relationship to a member of the social network associated with a social network content item is determined and stored in an electronic data storage, based, at least in part, on a social network profile of the member and social network profiles of the plurality of users, such as with the processor. In an example, the social network content item is a social network profile page. In an example, the relevance is based on the relationship as compared to the social network profile of the user. In an example, the social network profile has a plurality of characteristics and the relationship has a plurality of characteristics and the characteristics of the social network profile and the relationship are compared with respect to one another. In an example, the characteristics are weighted according to at least one of a significance of the characteristics and a trend of the characteristics. In an example, the significance of the characteristics is determined based on a comparison with the social network profile of the member. In an example, the significance is predetermined according to an overall characteristic of the social network.

At operation 804, a network interface device is caused to display information on a user interface related to the relationship on the user interface based, at least in part, on the relevance, such as with the processor. In an example, the information is at least one of: the relationship of the at least some of the plurality of users, a number of the at least some of the plurality of users, a provenance of the at least some of the plurality of users accessing the social network content item, and a rate of change in the at least some of the plurality of users accessing the social network content item over time. In an example, the provenance is at least one of a search, an accessing of another social network content item related to the user, a link from outside of the social network, and a type of user device (e.g., a personal computer, a smartphone, a tablet computer, etc). In an example, the relationship is at least one of a common employer, a common industry, a common occupation, a common location, a common educational institution, a common group, and a common gender.

Figure 9:
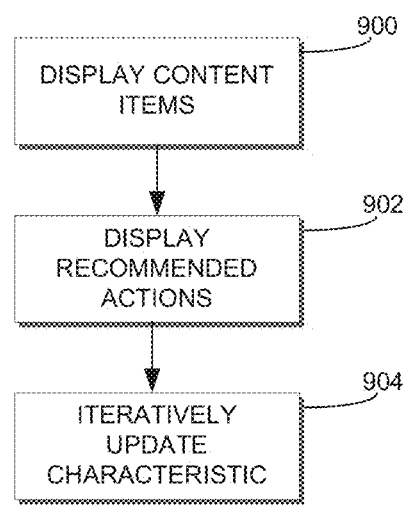
FIG. 9 is a flowchart for displaying recommended actions based on iteratively updated display characteristics, in an example embodiment.

FIG. 9 is a flowchart for displaying recommended actions based on iteratively updated display characteristics. The flowchart may be performed with any of a variety of devices and systems disclosed herein, as well as with any suitable system known in the art.

At operation 900, a network interface device is caused to display, on a user interface, social network content items, such as with a processor.

At operation 902, the network interface device is caused, such as with a processor, to display, on the user interface, recommended actions related to a social network and a member of the social network associated with the user interface, the recommended actions being implementable based on a user input via the user interface, the recommended actions being displayed based on at least one display characteristic. In an example, the display characteristic is at least one of a location on the user interface, a font, a text size, and a color. In an example, causing the network interface device to display the recommended actions displays the recommended actions interleaved with the social network content items on the user interface. In an example, causing the network interface device to display the recommended actions adjusts a location of the recommended actions on the user interface relative to the social network content items.

At operation 904, the display characteristic is iteratively updated, such as by the processor, based, at least in part, on an implementation, by the user, of at least one of the recommended actions. In an example, iteratively updating the display characteristic is configured to increase a likelihood of the user implementing the recommended actions. In an example, the display characteristic is one of a plurality of display characteristics, and iteratively updating the characteristic includes iteratively updating some of the plurality of display characteristics based on adjusting ones of the display characteristics.

In an example, iteratively updating ones of the plurality of display characteristics iteratively updates the ones of the plurality of display characteristics independently based on the implementation, by the user, of the at least one of the recommended actions. In an example, iteratively updating ones of the plurality of display characteristics iteratively updates ones of the plurality of display characteristics independently further based on a non-implementation, by the user, of the at least one of the recommended actions. In an example, iteratively updating ones of the plurality of display characteristics iteratively updates the display characteristic based on a reaction by other users of the social network to recommended actions including the display characteristic. In an example, each of the recommended actions has a likelihood of implementation by the user, and iteratively updating the display characteristic updates the display characteristics based on the likelihood of implementation.

System

Figure 10:
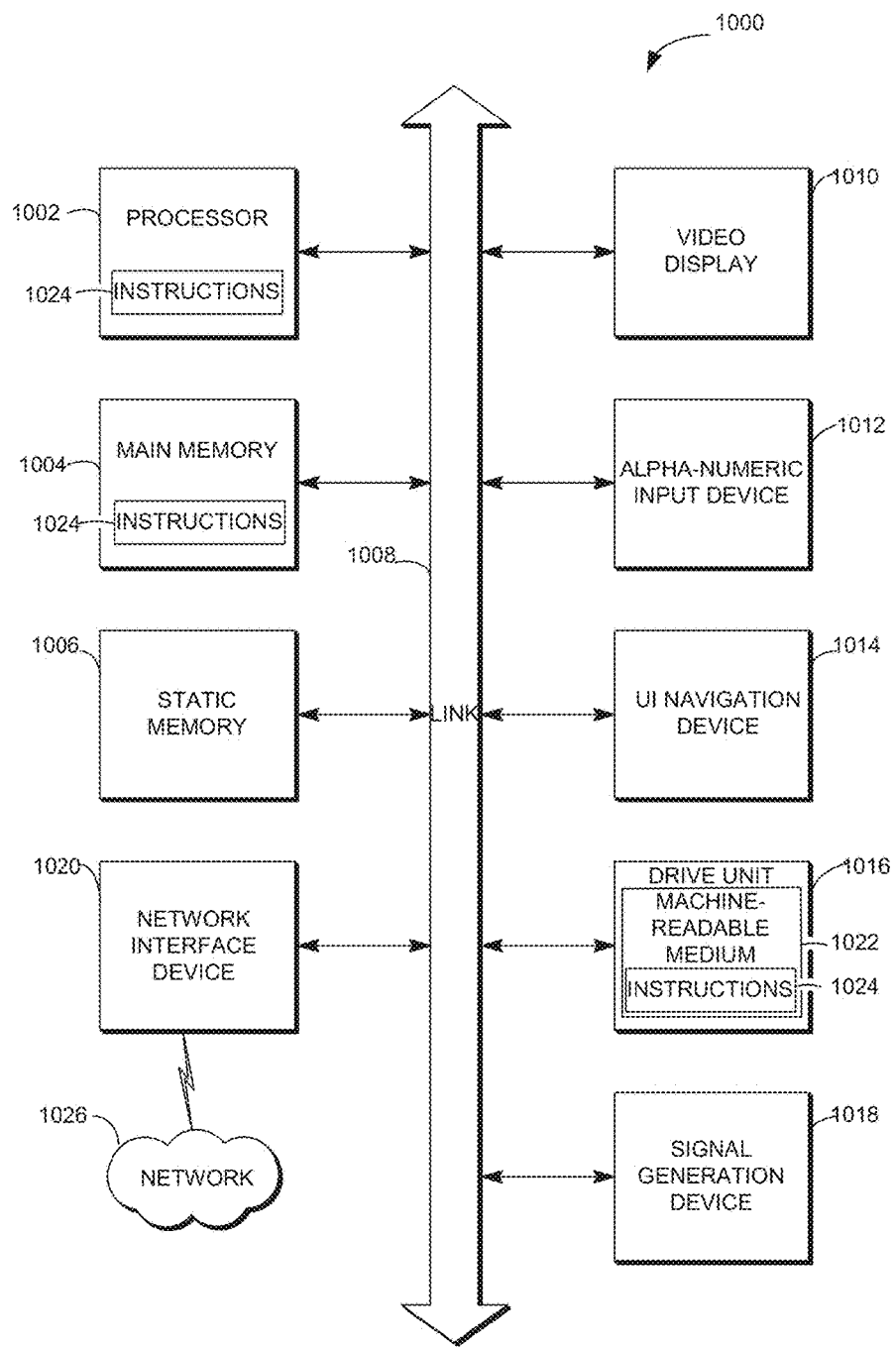
FIG. 10 is a block diagram illustrating components of a machine able to read instructions from a machine-readable medium.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system and within which instructions 1024 (e.g., software) for causing the machine 1000 to perform any one or more of the methodologies discussed herein may be executed. In alternative embodiments, the machine 1000 operates as a stand-alone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

In Example 1, a system includes a network interface device configured to be communicatively coupled to a user interface, an electronic data storage configured to store social network data related to a plurality of users having accessed a social network content item, and a processor, coupled to the network interface device and the electronic data storage, configured to identify a relationship among at least some of the plurality of users, determine a relevance of the relationship to a member of the social network associated with the social network content item based, at least in part, on a social network profile of the member and social network profiles of the plurality of users, and cause the network interface device to display, on the user interface, information related to the relationship on the user interface based, at least in part, on the relevance.

In Example 2, the system of Example 1 optionally further includes that the social network content item is a social network profile page.

In Example 3, the system of any one or more of Examples 1 and 2 optionally further includes that the information is at least one of: the relationship of the at least some of the plurality of users, a number of the at least some of the plurality of users, a provenance of the at least some of the plurality of users accessing the social network content item, and a rate of change in the at least some of the plurality of users accessing the social network content item over time.

In Example 4, the system of any one or more of Examples 1-3 optionally further includes that the provenance is at least one of a search, an accessing of another social network content item related to the user, a link from outside of the social network, and a device type.

In Example 5, the system of any one or more of Examples 1-4 optionally further includes that the relationship is at least one of a common employer, a common industry, a common occupation, a common location, a common educational institution, a common group, and a common gender.

In Example 6, the system of any one or more of Examples 1-5 optionally further includes that the relevance is based on the relationship as compared to the social network profile of the user.

In Example 7, the system of any one or more of Examples 1-6 optionally further includes that the social network profile has a plurality of characteristics and the relationship has a plurality of characteristics and the characteristics of the social network profile and the relationship are compared with respect to one another.

In Example 8, the system of any one or more of Examples 1-7 optionally further includes that the characteristics of the social network profile and the relationship are weighted according to at least one of a significance of the characteristics and a shift in a trend in the characteristics.

In Example 9, the system of any one or more of Examples 1-8 optionally further includes that the characteristics are weighted according to a significance of the characteristics.

In Example 10, the system of any one or more of Examples 1-9 optionally further includes that the significance is predetermined according to an overall characteristic of the social network.

In Example 11, a method includes identifying, with a processor, a relationship among at least some of a plurality of users, determining, with the processor, a relevance of the relationship to a member of the social network associated with a social network content item, stored in an electronic data storage, based, at least in part, on a social network profile of the member and social network profiles of the plurality of users, and causing, with the processor, a network interface device to display information on a user interface related to the relationship on the user interface based, at least in part, on the relevance.

In Example 12, the method of Example 11 optionally further includes that the social network content item is a social network profile page.

In Example 13, the method of any one or more of Examples 11 and 12 optionally further includes that the information is at least one of: the relationship of the at least some of the plurality of users, a number of the at least some of the plurality of users, a provenance of the at least some of the plurality of users accessing the social network content item, and a rate of change in the at least some of the plurality of users accessing the social network content item over time.

In Example 14, the method of any one or more of Examples 11-13 optionally further includes that the provenance is at least one of a search, an accessing of another social network content item related to the user, a link from outside of the social network, and a device type.

In Example 15, the method of any one or more of Examples 11-14 optionally further includes that the relationship is at least one of a common employer, a common industry, a common occupation, a common location, a common educational institution, a common group, and a common gender.

In Example 16, the method of any one or more of Examples 11-15 optionally further includes that the relevance is based on the relationship as compared to the social network profile of the user.

In Example 17, the method of any one or more of Examples 11-16 optionally further includes that the social network profile has a plurality of characteristics and the relationship has a plurality of characteristics and the characteristics of the social network profile and the relationship are compared with respect to one another.

In Example 18, the method of any one or more of Examples 11-17 optionally further includes that the characteristics of the social network profile and the relationship are weighted according to a significance of the characteristics.

In Example 19, the method of any one or more of Examples 11-18 optionally further includes that the significance of the characteristics is determined based on a comparison with the social network profile of the member.

In Example 20, the method of any one or more of Examples 11-19 optionally further includes that the significance is predetermined according to an overall characteristic of the social network.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
a non-transitory computer readable medium comprising instructions which, when implemented on a processor, cause the processor to perform operations comprising:
for a predetermined social network content item of an online social networking system, identify a relationship among at least some of a plurality of users who have accessed the predetermined social network content item, the relationship including a plurality of characteristics common among the social network profiles of the at least some of the plurality of users, and the predetermined social network content item associated with a member having a social network profile with the online social networking system, the member not being one of the plurality of users;

weight characteristics of the social network profile of the member and the characteristics of the relationship according to at least one of a significance of the characteristics and a shift in a trend in the characteristics;

determine a relevance score indicating a relevance of the relationship to the member associated with the predetermined social network content item based, at least in part, on a comparison of the characteristics of the social network profile of the member, as weighted, and the plurality of characteristics of the relationship, as weighted; and cause the network interface device to display, on the user interface, based on the relevance score as determined, a statistic of the relationship of the member to the plurality of users on the user interface, wherein the statistic is at least one of:

a number of the plurality of users having the relationship, a percentage of the plurality of users having the relationship, and a rate of change of the relationship.

2. The system of claim 1, wherein the relationship is at least one of a common employer, a common industry, a common occupation, a common location, a common educational institution, a common group, and a common gender.

3. A method, comprising:
for a predetermined social network content item of an online social networking system, identifying, with a processor, a relationship among at least some of a plurality of users who have accessed the social network content item, the relationship including a plurality of characteristics common among the social network profiles of the at least some of the plurality of users, and the predetermined social network content item associated with a member having a social network profile with the online social networking system, the member not being one of the plurality of users;

weighting, with the processor, characteristics of the social network profile of the member and the characteristics of the relationship according to at least one of a significance of the characteristics and a shift in a trend in the characteristics;

determining, with the processor, a relevance score indicating a relevance of the relationship to the member associated with the predetermined social network content item based, at least in part, on a comparison of the characteristics of the social network profile of the member, as weighted, and the plurality of characteristics of the relationship, as weighted; and causing, with the processor, a network interface device to display information on a user interface, based on the relevance score as determined, a statistic of the relationship of the member to the plurality of users on the user interface, wherein the statistic is at least one of:

a number of the plurality of users having the relationship, a percentage of the plurality of users having the relationship, and a rate of change of the relationship.

4. The method of claim 3, wherein the relationship is at least one of a common employer, a common industry, a common occupation, a common location, a common educational institution, a common group, and a common gender.

5. A non-transitory computer readable medium comprising instructions which, when implemented on a processor, cause the processor to perform operations comprising:

for a predetermined social network content item of an online social networking system, identify a relationship among at least some of a plurality of users who have accessed the predetermined social network content item of an online social networking system, the relationship including a plurality of characteristics common among the social network profiles of the at least some of the plurality of users, and the predetermined social network content item associated with a member having a social network profile with the online social networking system, the member not being one of the plurality of users;

weight characteristics of the social network profile of the member and the characteristics of the relationship according to at least one of a significance of the characteristics and a shift in a trend in the characteristics;

determine a relevance score indicating a relevance of the relationship to the member associated with the predetermined social network content item based, at least in part, on a comparison of the characteristics of the social network profile of the member, as weighted, and the plurality of characteristics of the relationship, as weighted; and cause the network interface device to display, on the user interface, based on the relevance score as determined, a statistic of the relationship of the member to the plurality of users on the user interface, wherein the statistic is at least one of:

a number of the plurality of users having the relationship, a percentage of the plurality of users having the relationship, and a rate of change of the relationship.

6. The computer readable medium of claim 5, wherein the relationship is at least one of a common employer, a common industry, a common occupation, a common location, a common educational institution, a common group, and a common gender.

* * * * *